United States Patent [19]

Lebedev et al.

[11] Patent Number: 4,471,203
[45] Date of Patent: Sep. 11, 1984

[54] PROGRAM CONTROL DEVICE FOR CONTROLLING FLASH BUTT WELDING PROCESS

[76] Inventors: Vladimir K. Lebedev, ulitsa Engelsa, 25, kv. 12; Sergei I. Kuchuk-Yatsenko, ulitsa Filatova, 1/22, kv. 47; Valery G. Krivenko, ulitsa Ordzhonikidze, 3, kv. 35; Vitaly T. Cherednichok, Zadorozhny pereulok, 6, kv. 41; Stanislav D. Dobrovolsky, ulitsa Zhukova, 22, kv. 7; Vasily A. Sakharnov, ulitsa Solomenskaya, 41, kv. 93; Boris A. Galian, ulitsa Lenina, 88/92, kv. 110, all of Kiev, U.S.S.R.

[21] Appl. No.: 197,666

[22] Filed: Oct. 16, 1980

[51] Int. Cl.³ .......................................... B23K 11/04
[52] U.S. Cl. .................................. 219/101; 219/102
[58] Field of Search .................. 219/97, 100, 101, 102

[56] References Cited

U.S. PATENT DOCUMENTS 4,044,219  8/1977  Lebedev et al. ...................... 219/97

Primary Examiner—C. C. Shaw

[57] ABSTRACT

Disclosed are welding current pick-ups which are switched into welding circuits. Outputs of these pick-ups are connected to inputs of a logical coincidence unit having its output connected to a control input of a welding program control unit whose output is connected with a drive adapted for moving the workpieces being welded.

2 Claims, 2 Drawing Figures

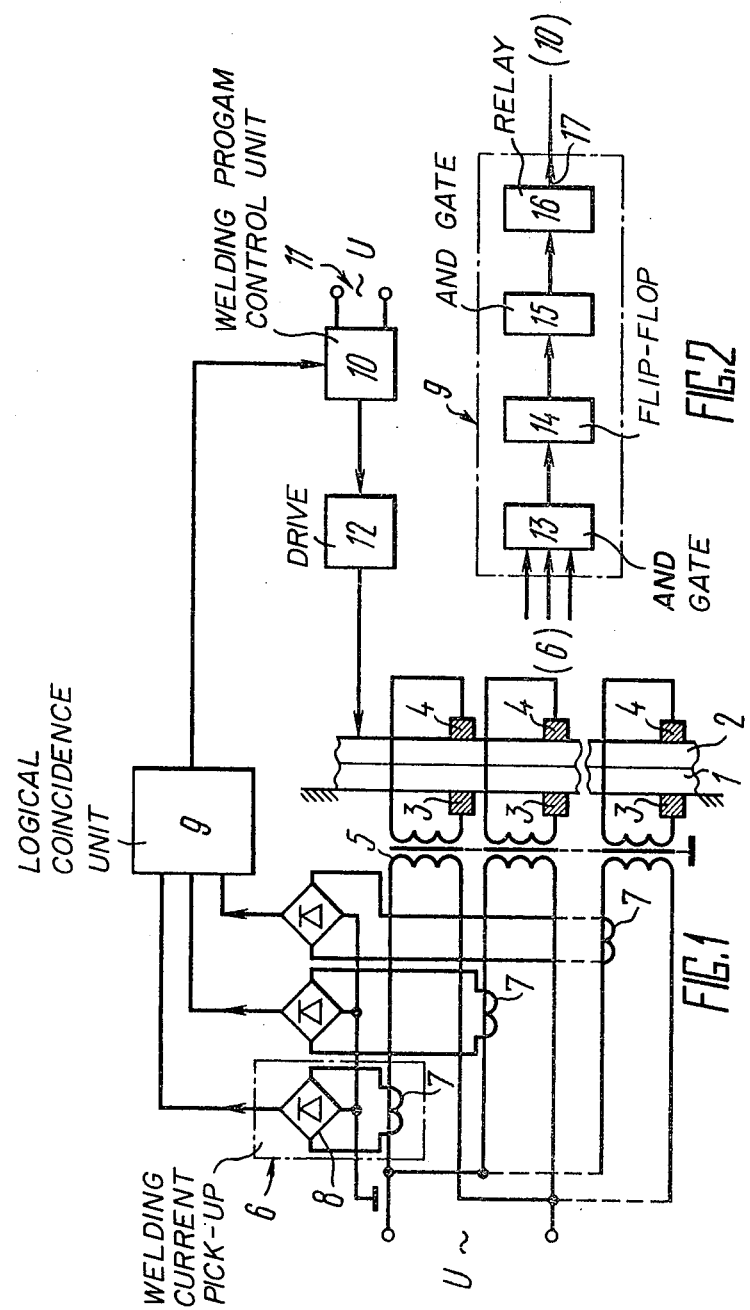

PROGRAM CONTROL DEVICE FOR CONTROLLING FLASH BUTT WELDING PROCESS

BACKGROUND OF THE INVENTION

1. Field of the Invention

The present invention relates to flash butt welding, and particularly to apparatus for program control of flash butt welding.

Most efficiently the invention can be used in simultaneously welding several joints, as well as in welding articles having long seams to be formed, such as, for example, metal sheets measuring several meters in width and pipes of large diameters.

2. Prior Art

There is known a program control device for controlling a flash butt welding process (cf. USSR Author's Certificate No. 557,889) comprising welding current pick-ups switched into each welding circuit, and a welding program control unit having a power supply circuit and being connected through its output with a drive for moving workpieces being welded. This device further includes a peak signal detector having inputs connected to outputs of the welding current pick-ups and an output connected, through a parallel-connected proportional and real differentiating elements, to a comparator unit.

This prior art device operates as follows. A preset current magnitude from a pick-up, an actual current magnitude and a time derivative thereof are applied to the comparator unit. The amplified signal from the comparator unit is fed to the welding program control unit controlling the drive for moving the work-pieces being welded. It is to be noted that the speed of approach of the workpieces is proportional to the said signal.

Thus, the operation of the above device consists in detecting a maximal magnitude of the current density in one of the parallel circuits, and in controlling the welding process to maintain stability thereof based on the said maximal magnitude of the current density.

However, in the case of using the prior art device, a starting flashing allowance has to be increased. Moreover the welding time also has to be increased to compensate for an irregular preparation of abutting ends of the workpieces to be welded together, which in the end brings down the efficiency of the welding process. In addition non-uniform heating of individual joints being welded affects the quality of the resulting weld joints.

SUMMARY OF THE INVENTION

The principal object of the invention is to provide a program control device for controlling flash butt welding, which due to analyzing signals received from each joint in the course of flashing of abutting ends being joined, ensures a higher efficiency of the welding process and a better quality of the resulting weld joints.

Another object of the invention is to reduce a flashing allowance for the workpieces being welded.

Yet another object of the invention is to decrease that portion of welding time which is caused by an irregular preparation of workpiece edges before welding.

These and the other objects of the invention are accomplished by a device for controlling flash butt welding of preferably several joints simultaneously which comprises welding current pick-ups switched into each welding circuit, and a welding program control unit having a power supply circuit and being connected through its output to a drive for moving the workpieces, and further includes a logic coincidence unit having inputs connected to outputs of the welding current pick-ups, and outputs connected to an input of the welding program control unit.

It is expedient that the logic coincidence unit include a logic AND-gate, a flip-flop, a logic AND-gate, and a relay whose contact, which is a control input of the welding program control unit, is connected in the power supply circuit thereof, and the winding of which is connected, through the logic AND-gate and the flip-flop, to the output of the logic AND-gate having inputs connected to the outputs of the welding current pick-ups.

Such embodiment of the invention ensures a high efficiency of the welding process and better quality of the resulting weld joints.

BRIEF DESCRIPTION OF THE DRAWINGS

The nature of the invention will be clear from the following description of a specific embodiment thereof taken in conjunction with the accompanying drawings, wherein:

FIG. 1 represents a block diagram of the device of the invention; and

FIG. 2 represents one possible embodiment of a logical coincidence unit according to the invention.

DETAILED DESCRIPTION OF THE INVENTION

Workpieces 1 and 2 to be welded together by flash butt welding are clamped by current-carrying jaws 3 and 4 which, through several parallel circuits, there is applied voltage from transformers 5. The number of the transformers 5 depends on the length of seams to be formed and, as practice shows, may reach 10–12. Connected in the welding circuit of each transformer 5 are welding current pick-ups 6.

The welding current pick-ups are intended for producing signals in the presence of a certain current magnitude in a welding circuit. The welding circuit pick-ups 6 are current transformers having their outputs connected to inputs of rectifiers 8. The rectifiers 8 outputs which are the outputs of the welding current pick-ups 6, are connected to inputs of a logical coincidence unit 9 whose output is connected to a control input of a program control unit 10. The device 9 is adapted to start the unit 10 at the moment when the current along the whole welding circuit reaches a certain level.

The program control unit 10, having a power supply circuit 11, is connected through its output with a drive 12 adapted for moving the workpieces 1 and 2. According to one embodiment of the invention the program control unit is a multicircuit time relay, and the drive 12 includes an electronic or electromechanical booster, a d.c. motor, a reduction gear, a control sliding valve and a hydraulic cylinder (cf. U.S. Pat. No. 3,335,257).

In the preferred embodiment of the invention the logical coincidence unit 9 includes a logic AND-gate 13, a flipflop 14, a logic AND-gate 15, and a relay 16 whose contact 17, being a control input of the welding program control unit 10, is connected in the power supply circuit 11 of the unit 10, and whose winding, through the logic AND-gate 15 and the flip-flop 14, is connected to the output of the logic AND-gate 13 having its outputs connected to the outputs of the welding current pick-ups 6.

The logic AND-gate 13 is intended for delivering all the input signals, and the flip-flop 14 is adapted for storing a signal at its output in the absence of a signal at the ouput of the logic AND-gate 13.

The logic AND-gate 15, having a high load capacity, serves as a decoupling network in the case of switching-on of the relay 16.

Such construction of the logical coincidence unit 9 insures that the moment of the simultaneous arrival of signals at its input is determined with a high degree of precision and the power supply circuit of the unit 10 is switched on at a right moment.

The logical coincidence unit 9 features a high noise immunity since the switching-on of the power supply circuits is effected directly through the output contact of the relay.

The logical coincidence unit 9 may be variously otherwise embodied. It may have, for example, multiple input logic AND-gate having its output connected to the flip-flop. In this case however, the output of the flip-flop is connected directly to the control input of the program control unit 10 whose construction is based on logic elements, which complicates to a great extent the unit 10, thereby making the unit more costly.

The welding program control device operates as follows. Welding voltage from the transformer 5 is applied, through the current-carrying jaws 3 and 4 to the workpieces 1 and 2. The workpieces 1 and 2 are moved towards each other by the drive 12, with the approach speed being controlled by the welding program control unit 10. The starting speed of approach of the workpieces is selected so as to ensure a more rapid flashing of the workpiece butt end irregularities without causing the already flashed parts thereof to be heated until the flashing process takes place along the whole line of the seam to be formed.

In the course of upsetting of the work pieces 1 and 2 the abutting ends thereof begin to fuse down at their different portions, which is caused by irregularities resulting from inadequate preparation of the edges i.e. abutting ends of the workpieces 1 and 2, and uneven clamping thereof by the jaws 3 and 4. In this case the welding current will flow in the circuits of only those transformers 5 at the sections of which there takes place contacting and flashing of the abutting edges of the work pieces 1 and 2. As a result, signals indicative of the presence of the welding current in a respective welding circuit are fed to the corresponding inputs of the logical coincidence unit 9, in which case a signal at the output of the unit 9 does not appear. As indicated above, the logical coincidence unit 9 is constructed so that the output signal is generated only in the case of presence of signals at all its inputs the number of which is determined by the number of the welding current pick-ups 6.

As the abutting edges of the workpieces 1 and 2 fuse down their edges become more even, and at the moment when the welding current flows in each circuit of the transformers 5, signals will be fed to all the inputs of the unit 9 from the welding current pick-ups 6, in which case at the output of the unit 9 there appears a signal to start the welding program control unit 10.

Thus, programme controlled welding begins at the moment when the work pieces being welded begin to flash off over the whole length of the seam to be formed.

The logical coincidence unit 9 shown in FIG. 2 operates as follows. When signals are applied to all the inputs of the logic AND-gate 13, there appears a fixed signal at the output thereof which, being applied to the input of the logic AND-gate 15, causes the relay 16 to operate and through its contact 17 to energize the welding program control unit 10. Beginning from this moment the welding process proceeds under the control of the unit 10.

The proposed device allows the flashing allowance to be considerably reduced and the efficiency and quality of welding to be improved.

This invention may be variously otherwise embodied within the scope of the appended claims.

What is claimed is:

1. A program control device for controlling flash butt welding of several joints simultaneously, comprising:
    welding circuits;
    welding current pick-ups connected in each said welding circuit, and having outputs;
    logical coincidence means having inputs to which are applied signals from the outputs of said welding current pick-ups, with an output signal of said logical coincidence means being produced when signals are applied to all its inputs;
    welding program control means having a power supply circuit which is switched on at the moment when there appears an output signal of said logical coincidence means; and
    drive means for moving the workpieces being welded, and being controlled by said welding program control means.

2. A program control device for controlling flash butt welding of several joints simultaneously, comprising:
    welding circuits;
    welding current pick-ups connected in each said welding circuit, and having outputs;
    logical coincidence means having inputs to which are applied signals from the outputs of said welding current pick-ups, with an output signal of said logical coincidence means being produced when signals are applied to all its inputs and including a logic AND-gate having inputs the number of which inputs is equal to the number of said welding current pick-ups, and an output at which a signal appears at the moment when signals are applied to all the inputs of said logic AND-gate, a flip-flop adapted for storing an output signal in the absence of a signal at the output of said logic AND-gate, and having an input connected to the output of said logic AND-gate and an output; a logic AND-gate having an input connected to the output of said flip-flop, and an output; and a relay having a contact switched into the power supply circuit of said welding program control means, and a winding connected to the output of said logic AND-gate;
    welding program control means having a power supply circuit which is switched on at the moment when there appears an output signal of said logical coincidence means; and
    drive means for moving the workpieces being welded, and being controlled by said welding program control means.

* * * * *